United States Patent [19]

Rebeaud

[11] Patent Number: 5,784,939
[45] Date of Patent: Jul. 28, 1998

[54] DEVICE FOR CENTERING AND LOCKING A TOOL-SUPPORTING FRAME IN A DIE-CUTTING MACHINE

[75] Inventor: Jean-Claude Rebeaud, Le Mont, Switzerland

[73] Assignee: Bobst SA, Lausanne, Switzerland

[21] Appl. No.: 791,461

[22] Filed: Jan. 27, 1997

Related U.S. Application Data

[63] Continuation of Ser. No. 433,317, May 3, 1995, abandoned.

[30] Foreign Application Priority Data

May 4, 1994 [CH] Switzerland ............... 01395/94

[51] Int. Cl.$^6$ ...................................................... B26D 5/02
[52] U.S. Cl. .................... 83/563; 83/698.31; 83/698.71
[58] Field of Search ............................. 83/563, 698.31, 83/698.71, 699.11, 698.91

[56] References Cited

U.S. PATENT DOCUMENTS

| 447,096 | 2/1891 | Yoder | 403/322 |
|---|---|---|---|
| 813,613 | 2/1906 | Boals | 403/324 |
| 1,026,352 | 5/1912 | Hamel | 403/324 |
| 1,150,681 | 8/1915 | Kelly et al. | 403/324 |
| 1,223,833 | 4/1917 | Robbins | 403/324 |
| 3,786,731 | 1/1974 | Bobst et al. | |
| 4,627,321 | 12/1986 | Moore | 83/698.91 |
| 4,960,026 | 10/1990 | Terpstra | 83/818 |
| 5,072,507 | 12/1991 | Meeks . | |
| 5,338,133 | 8/1994 | Torenero | 403/321 |
| 5,555,921 | 9/1996 | Aigner | 403/374 |

FOREIGN PATENT DOCUMENTS

2 354 882   1/1978   France .

*Primary Examiner*—Kenneth E. Peterson
*Assistant Examiner*—Sean Pryor
*Attorney, Agent, or Firm*—Hill & Simpson

[57] ABSTRACT

A device for centering and locking tool-supporting frames has two centering points and one centering and locking point. The centering point as well as the point for centering and locking is equipped with a first and second centering locking device which includes a flexible rod provided with a handle and being anchored at its other end in an anchor block belonging to the movable cradle and being moved manually in a slot provided in a plate from a locking position to an unlocking position. The flexible rod extends through an upper part of the centering and locking pin, which engages in the groove for the centering points and in a groove and a bore for the centering and locking point. First and second centering and locking devices may be actuated simultaneously or individually.

4 Claims, 9 Drawing Sheets

DEVICE FOR CENTERING AND LOCKING A TOOL-SUPPORTING FRAME IN A DIE-CUTTING MACHINE

This is a continuation of application Ser. No. 08/433,317 filed May 3, 1995, now abandoned.

BACKGROUND OF THE INVENTION

The present invention is directed to a device for centering and locking a tool-supporting frame in a die-cutting press, which is preferably a die-cutting press used for processing paperboard or cardboard.

At present, die-cutting presses for processing paperboard or cardboard to obtain folding-box blanks generally consist of several processing stations arranged successively one after the other. These stations in the order of their location in the press usually begin with an infeed station, followed by a die-cutting station, which is followed by a stripping station and, finally, a delivery station.

In this type of machine, the paperboard or cardboard matter has often the shape of rectangular sheets. These sheets are seized from the top of a pile located in the infeed station in order to be brought onto transport elements which shall carry them through the die-cutting station, the stripping station and to the delivery station.

In one of these die-cutting presses, the die-cutting station generally includes an upper beam or an upper crossbar fitted between two lateral frames and a lower beam or lower platen movable vertically relative to the upper frame. The die-cutting tool shaped as a plate which is provided with cutting and creasing rules is mounted on the lower part of the upper beam in such a way that, in the course of a vertical motion of the movable lower beam from the down position to its uppermost position, the die-cutting action will be executed on the sheet of paperboard or cardboard. Obviously, a great number of box blanks can be arranged on the surface of a sheet and die-cut at one operation of the press. However, there are always bits of waste remaining between each of the blanks, which waste has to be stripped in order to obtain, in the delivery station, a semi-finished product having the shape of a sheet consisting of a plurality of box blanks connected to one another by bridges or nicks which will have to be broken in order to separate each of the blanks from the other blanks of the sheet.

The above-mentioned waste bits are removed from the sheet in the stripping station, which usually includes an upper tool and a lower tool in between which a perforated board is fitted and whose apertures are arranged exactly opposite the waste bits to be stripped. Moreover, these apertures have the same geometric shape as the waste bits. The upper and lower tools, as well as the perforated board, are moved vertically from a down position to an up position and back in synchronism with the motion of the sheets travelling in the machine. The upper stripping tool consists of a rectangular frame on which are mounted stripping elements having the shape of telescopic stripping pins, which can move in an axial direction. These stripping pins are adjustably mounted on crossbars which connect the lateral or longitudinal bars of the rectangular frame in such a way that the pins can be positioned where the waste bits to be stripped are situated and right opposite the telescopic pins fitted on a lower stripping tool. With other configurations, the upper stripping tool may have the shape of a wooden board in which non-telescopic pins have been fitted in appropriate places, whereas the lower stripping tool has the telescopic pins situated opposite the pins of the upper stripping tool.

As has been put forth in what has just been described, the waste bits are pinched between the pins of the upper and lower tool and taken downward through the apertures of the perforated plate during the vertical motion of the stripping elements. Such a stripping station is described more in detail in U.S. Pat. No. 3,786,731, whose disclosure is incorporated herein by reference thereto.

For the die-cutting press to be able to execute different runs corresponding to various kinds and sizes of blanks, it is necessary to be able to set the position of the stripping tools according to the run and, obviously, to change the perforation plate in order to adapt the plate which will correspond to the run to be executed. Generally, each of the different tools, either for die-cutting or for stripping, are centered according to a medium axis of the machine and with regard to a reference located on this medial axis in a front part of every tool so that the relationship alignments are obtained with a maximum accuracy and guarantees a repeating of the positioning when the tools are extracted from, or reinserted into the respective stations.

In order to facilitate these settings, the possibility has been left to take away the upper and lower tool as well as the perforated board of the machine. This operation is achieved by laterally extracting these different elements from the stripping station, as could be done with a drawer. To this aim, the upper and lower tools as well as the perforated board are each inserted in grooves provided in their respective cradles and centered as well as locked in their operating positions.

It is very important that the centering of these tools be achieved with high precision in order to guarantee the accuracy of the relative position between the upper and lower pins as well as with the apertures of the perforated board. In the stripping station known up to now, the perforated board and the lower and upper tools are centered by means of first pins belonging to one of the lengthwise bars of the tool-supporting frame and by means of a second pin belonging to the other lengthwise bar of this frame. Moreover, the locking of the tool-supporting frame is combined with the second centering pin. A setting of the lateral position and of the lengthwise position of the tool is, hence, possible by acting on the centering pins. Briefly, the centering of the tool is achieved at two points situated almost in the middle of the lengthwise bars of the tool supporting frame. The locking of the tool-supporting frame is achieved by means of a hook, which belongs to the cradle and is ensured on the end of the second centering pin by tightening a screw having a hexagonal head.

The use of this device for centering and locking has several drawbacks. First of all, with only two centering points situated on either side of the tool-supporting frame, a distortion of the frame occurs during the locking, which action or distortion is harmful to the accuracy for the relative positioning between the upper and lower stripping tools and the perforated board, which distortion is not admissible or allowable in the case of very small waste bits to be stripped. A distortion of the tool-supporting frame can also be caused by the mounting of the bar which supports the stripping pins and, in this case, the fact of using only two centering points will not allow a compensation for this distortion. Moreover, it is obvious that the frame, when centered and locked, will not be very rigid due to its fastening on only two points. Moreover, the misalignment between the upper and lower pins causes the tilting of the waste bits to be stripped and, hence, a jam which will require a standstill or stopping of the machine. This distortion influences also the alignment between the tools mounted in the other stations of the machine. One should also mention the fact that the locking operation requires the use of a tool for tightening the screw with the hexagonal head, which blocks the supporting frame.

In the field of packaging, the users of die-cutting presses are more and more confronted with various jobs which necessitate several tool exchanges, and their main worry remains in the drastic reduction of time allocated to these operations for increasing, as much as possible, the effective production time of their machines. The drawback regarding the accuracy of positioning of the various tools of the die-cutting press, which are also a bad working source which leads to jams, have also to be withdrawn in order to increase the effective production of the machine.

SUMMARY OF THE INVENTION

The present invention is directed to overcoming the above-mentioned drawbacks by providing the user with a device for centering and locking the tool-supporting frames, which should be accurate, reliable and with a quick fitting and dismantling.

To accomplish these aims, the present invention is directed to an improvement in a device for centering and locking tool-supporting frames in a die-cutting press, particularly in a die-cutting press used for processing paperboard or cardboard. The device has means for mounting the tool-supporting frames in a manner similar to a drawer in each of their respective movable cradles. The improvements are that the tool-supporting frames have centering points and one centering and locking point. The centering points as well as the centering and locking point are equipped with a centering and locking device which includes a rod provided with a handle being movable manually in a slot provided in a plate, which slot has both a locking position and an unlocking position.

Other advantages and features of the invention will be readily apparent from the following description of the preferred embodiments, the drawings and claims.

DESCRIPTION OF THE PREFERRED EMBODIMENTS

Figure 1:
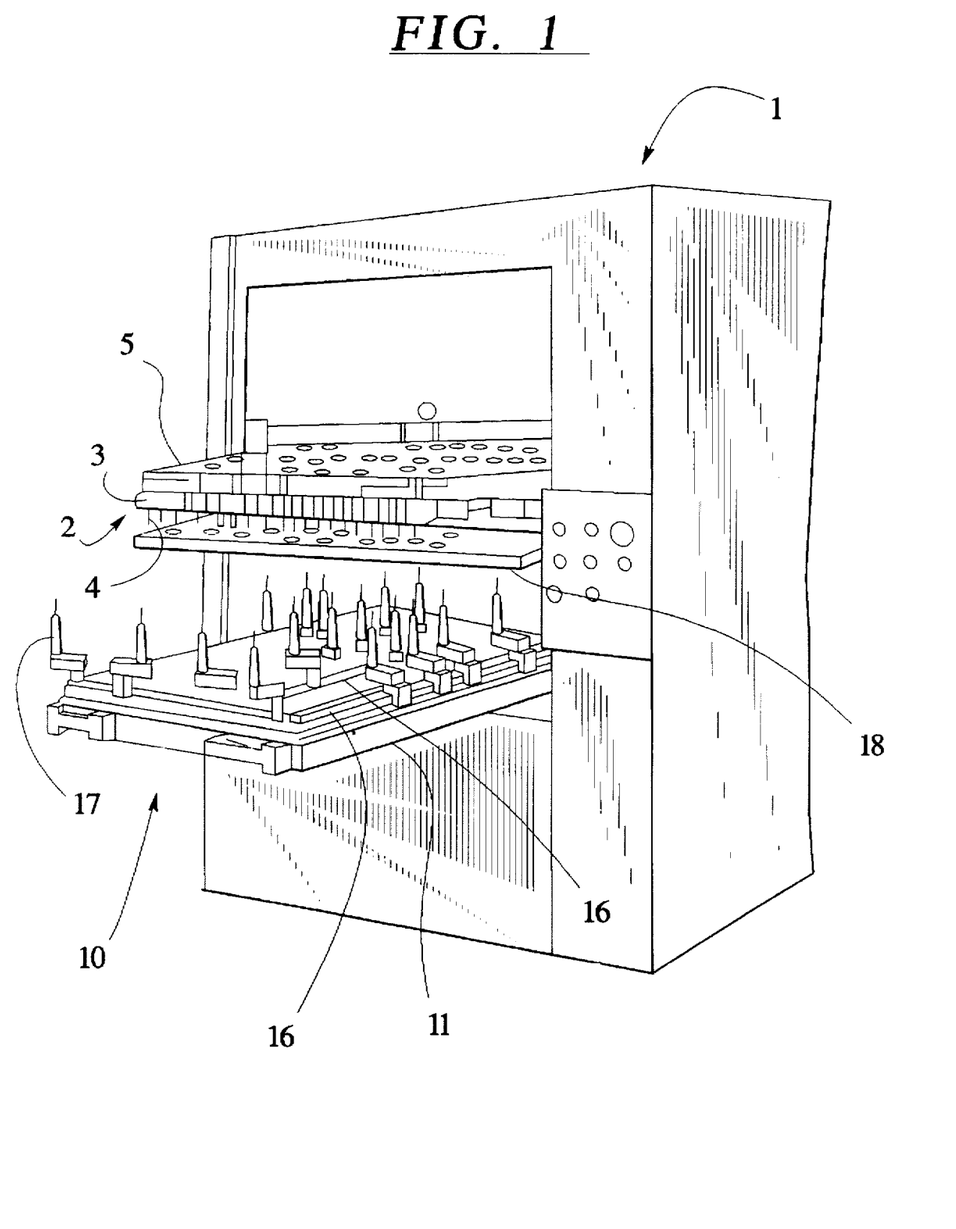
FIG. 1 is a perspective view of a stripping station in accordance with the present invention.
Figure 2:
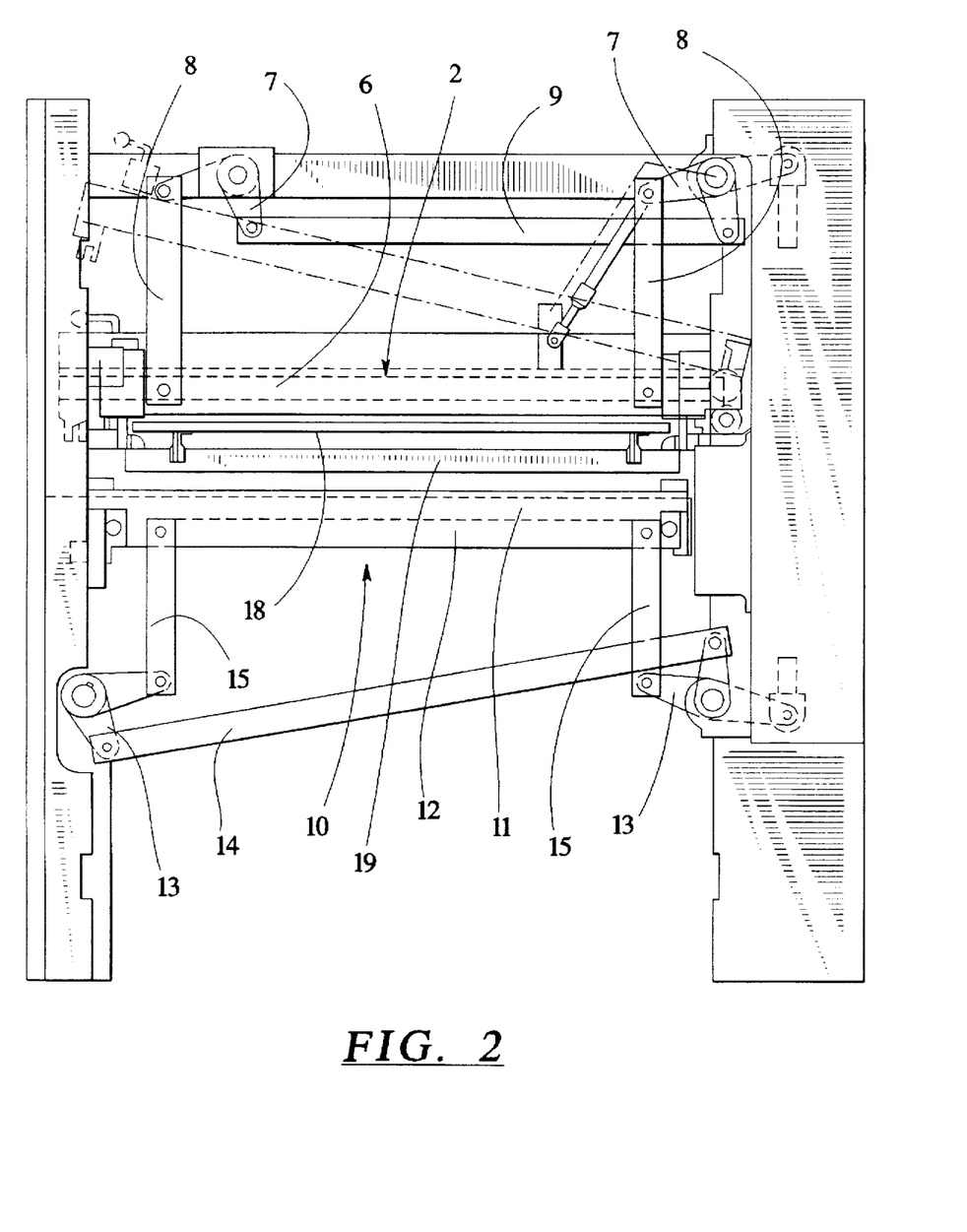
FIG. 2 is a front view of the stripping station.

The principles of the present invention are particularly useful when incorporated in a stripping station, generally indicated at 1 in FIG. 1, of a die-cutting press. The stripping station 1 includes an upper tool 2 having, in a chosen example, the shape of a wooden board 3 provided with stripping pins 4. The upper tool 2 is held in the upper support frame 5 and may slide as a drawer in non-represented grooves provided on the upper cradle 6 (FIG. 2). The cradle 6 is movable vertically under the action of a mounting arrangement including lever arms 7 and pull linkages 8 and 9.

As illustrated in FIG. 1, the stripping station 1 also includes a lower tool, generally indicated at 10, held in a lower supporting frame 11, which may also slide as a drawer in a non-represented sliding groove fitted on a lower cradle 12 (FIG. 2). The lower cradle 12 is also movable vertically under the action of the device, which includes lever arms 13 and pull linkages 14 and 15.

Generally, the lower tool has several bars 16 (FIG. 1), of which only a few have been illustrated in the drawings. A series of telescopic stripping pins 17 are mounted on each of these bars 16 opposite the stripping tools or pins 4 of the upper tool 2. Finally, the stripping station 1 includes a third element having the shape of a perforated board 18, which is mounted in the frame 19 (FIG. 2) and can also be taken out of the stripping station like a drawer. The apertures of the board 18 are arranged so as to take into account the shape of the waste bits to be stripped, and the stripping pins 4 and 17, which are arranged opposite one another, pinch the waste bits and taken them downward through the aperture of the board 18 when the cardboard sheet to be processed is at a standstill in the stripping station.

Figure 3:
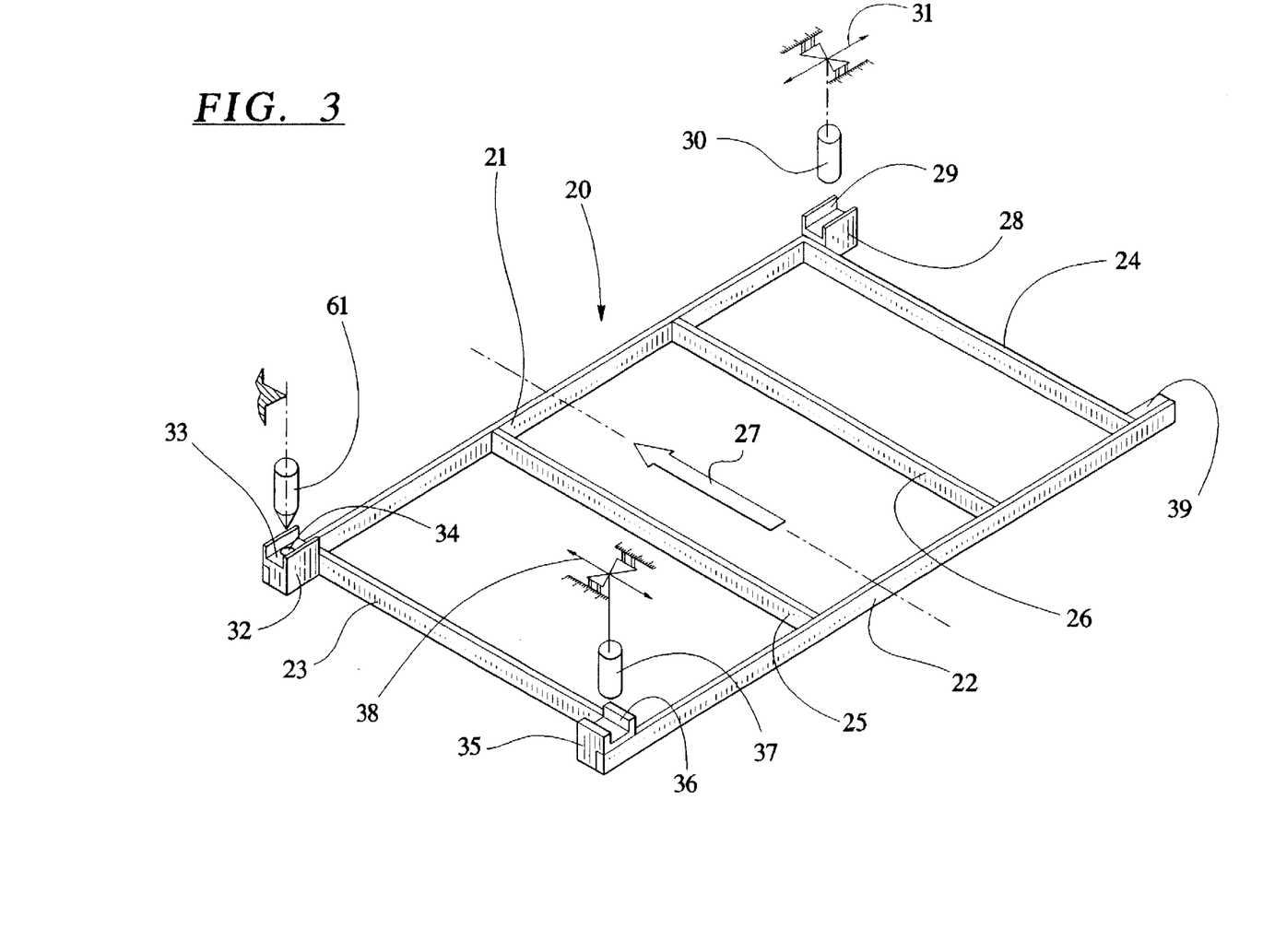
FIG. 3 is a perspective view of an upper tool-supporting frame.

An upper tool-supporting frame 20 (see FIG. 3) includes a first bar or side or member 21 and second bar or side member 22 which are connected to two end bars or crossbars 23 and 24 so as to form a rigid frame. In addition, the first and second bars 21 and 22 are braced with two other crossbars 25 and 26. In the chosen example, a sheet to be processed penetrates into the stripping station in a direction indicated by arrow 27 and the upper tool-supporting frame, for instance during a change of tools, will be taken out of this station in a direction extending perpendicular to the direction of the arrow 27. In a schematic way, the Figure represents, also, the centering and locking of the tool-supporting frame 20. The front part or downstream part, when taken in the direction of the travel of the sheet as indicated by arrow 27, of the frame 20, at the level of the first bar 21, is equipped with a guiding block 28 having a slot or groove 29 in which is engaged a guiding element that enables the motion of the frame in the direction shown by the double arrow 31. Still on the front part of the frame 20, opposite the guiding block 28, there is a locking block 32 with a slot or groove 33 and a bore 34 in which a centering and locking pin 61 engages. The rear part or upstream part of the frame 20, at the position of the second bar 22, is equipped with another guiding block 35 having a slot or groove 36 in which engages a guiding element 37 that enables the motion of the frame in the direction shown by the double arrow 38, which is parallel to the direction 27. Opposite to this guiding block 35, the rear part of the frame has a supporting element 39 which essentially consists of receiving a guiding element of the frame in a groove 85 (see FIG. 9). This arrangement for guiding, centering and locking of the frame gives the frame 20 an excellent rigidity when the frame is locked in the machine.

It should be mentioned that the construction of the lower tool-supporting frame is achieved according to the same principle, apart from the fact that the guiding blocks, such as 28 and 35, as well as the centering and locking block 32, are inverted so that the slots or grooves 29, 33 and 36 are turned downward in the lower tool-supporting frame.

Figure 4:
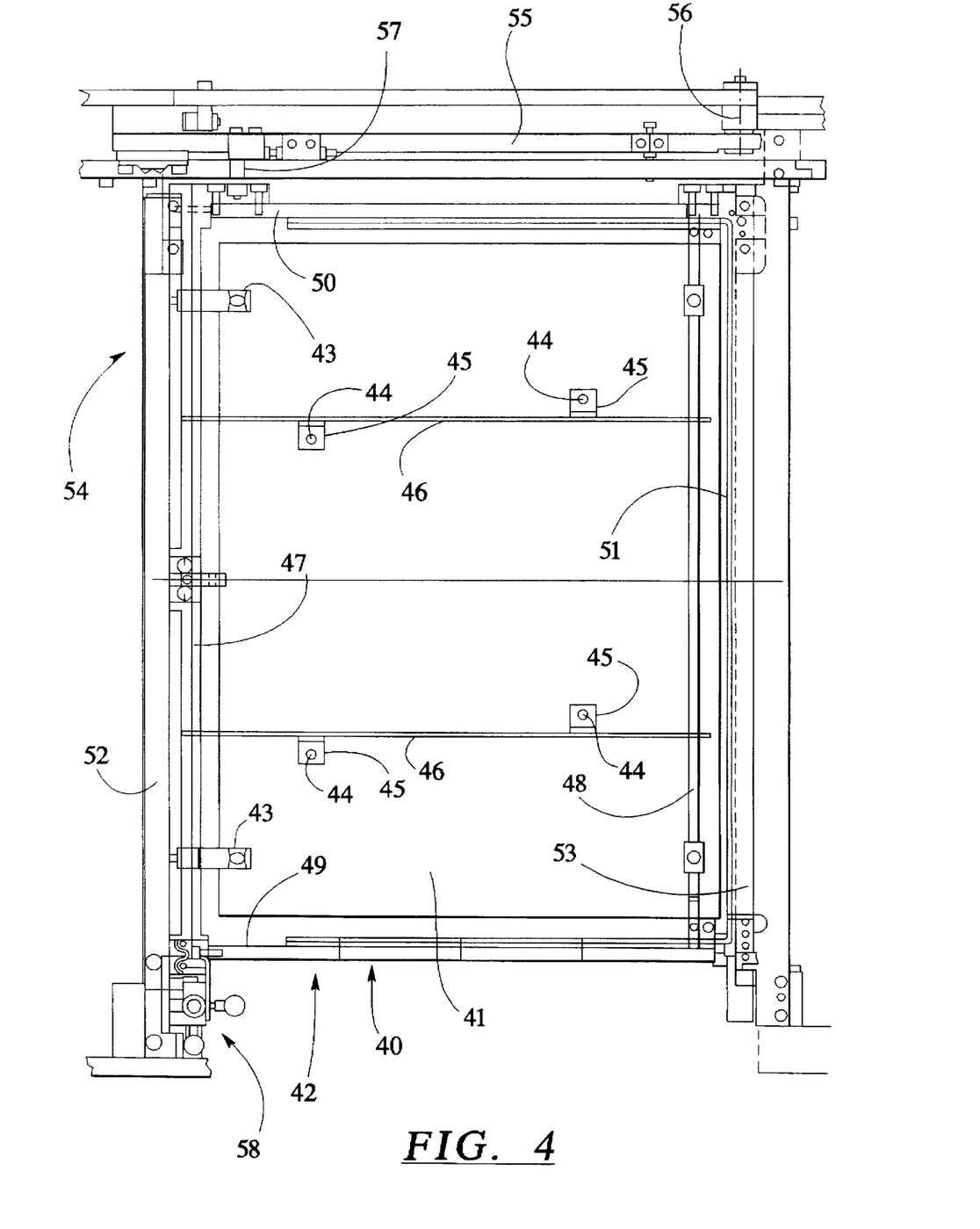
FIG. 4 is a plan view of a perforated board supporting frame.

The stripping board supporting frame 40 is shown in FIG. 4. The stripping board consists of a perforated plate 41, shown here without the apertures corresponding to the areas of the waste bits to be stripped. This perforated plate 41 is mounted on a frame 42 by means of saddles 43 and screws 44 tightened in squares 45 mounted on adjustable support bars 46, which rest on the crosswise front bar 47 of the frame 40 and on the crossbar 48, which also is adjustable and connected to two lengthwise bars 49 and 50 which connect the crosswise front bar to the crosswise rear bar 51 of the frame 40. The crosswise front bar 47 and the rear bar 51 engage in respective grooves in members 52 and 53 which belong to a movable cradle indicated at 54, which is actuated by a pivot lever 55 around a rotation point 56 located in the neighborhood of the crosswise rear bar 51 under the action of a control means, which is not represented here. The movable cradle 54 is connected to the pivoting lever 55 by an adjustable centering element 57 and by a centering and locking device 58, which will be described in more detail with reference to FIGS. 11 and 12.

Figure 5:
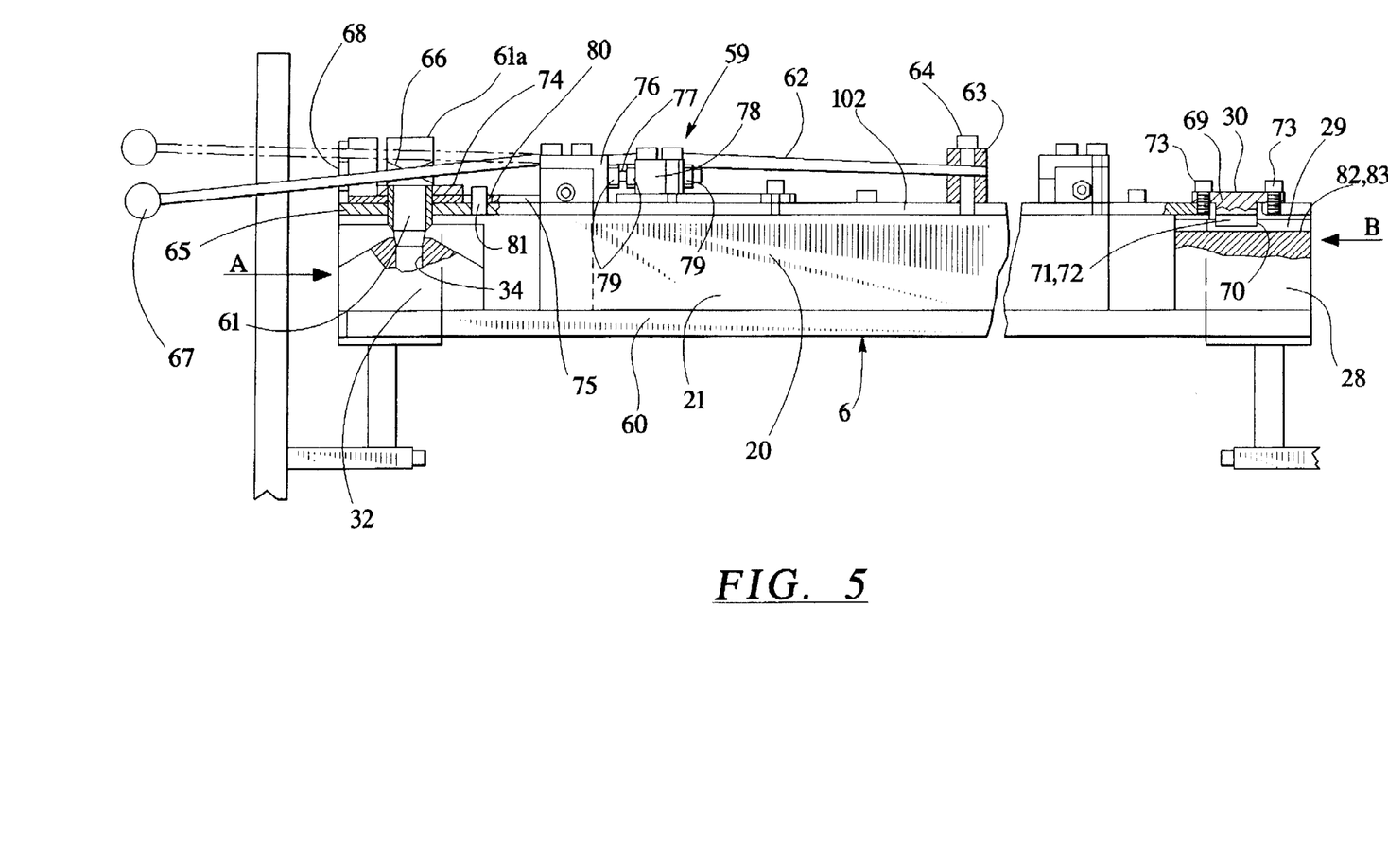
FIG. 5 is a side view with portions cut away for purposes of illustration of a first element for locking an upper tool-supporting frame.
Figure 7:
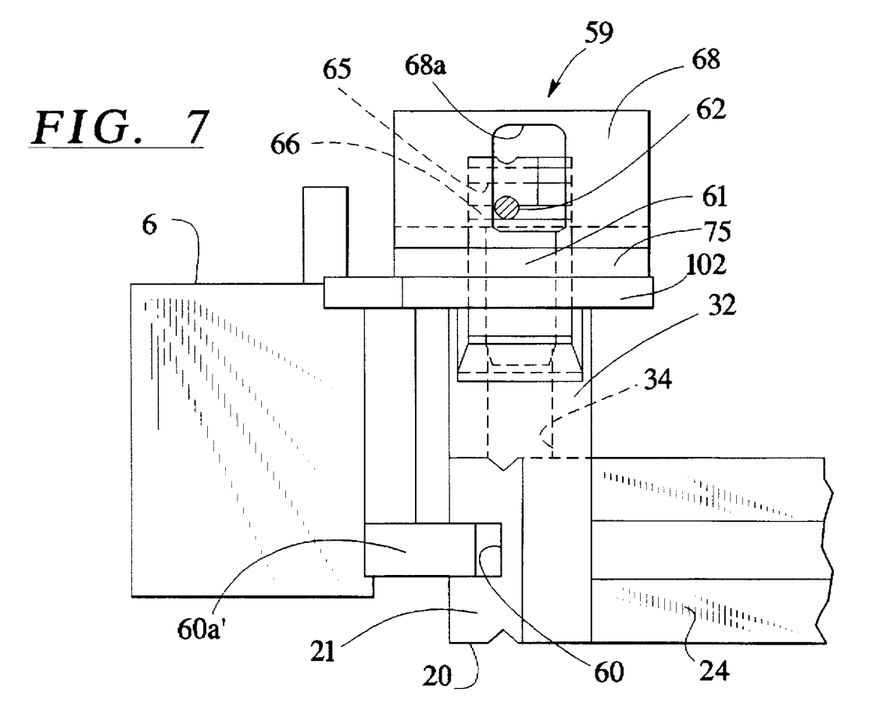
FIG. 7 is an end view taken in the direction of arrow A of FIG. 5.

The first locking element 59 for locking and centering an upper tool-supporting frame 20 is illustrated in FIG. 5. This Figure represents the front part of the tool-supporting frame 20, and particularly the first bar 21, when the bar has a groove 60 which receives a guide 60a (FIG. 7) of the upper cradle 6. The first locking and centering element 59 has a flexible rod 62 which is mounted at one of its ends on a slitted block 63 by means of two screws 64. The slitted block 63 is mounted on a plate 102 which is part of the upper cradle 6. This flexible rod 62 extends through an upper part of the centering and locking pin 61, which has a countersink with two opposite slanted planes 65 and 66, and the slanted planes make a shape of a roof so that the slot or aperture has the shape of opposing triangles in cross section. The centering and locking element 61 is mounted in a bushing 74 which is mounted on a packing strip 75 provided at one of its ends with a setting block 76, which receives a threaded rod 77 crossing an anchor block 78 mounted on the plate 102 of the upper cradle 6. The nuts 79 threaded onto the threaded rod 77 will, hence, allow for an adjustment of the desired position of the centering and locking pin by having the packing strip 75 moved. The strip 75 is guided by an oblong slit 80 in the strip receiving a cylindrical pin 81 projecting from the plate 102. The other end of the flexible rod is equipped with a handle 67. In order to maintain the locking position and the unlocking position, the flexible rod 62 is received in a bayonet square 68, which, as illustrated in FIG. 7, has a C-shaped slot 68a in a plate, which slot has an upper leg and a lower leg (see FIG. 7). The lower leg forms the locking position and the upper leg forms an unlocking position. This square or plate 68 is mounted on the packing strip 75. In the position shown in FIG. 5, the upper tool-supporting frame 20 is in a centered and locked position, i.e., the conical part of the centering and locking pin 61 is engaged in the bore 34 of the block 32 to hinder therewith every lateral extraction of the tool-supporting frame 20.

On an end of the side member 21 opposite the locking block 32, the frame 20 is guided by the guiding element 30 which engages in a slot or groove 29 of the guiding block 28. The guiding element 30 consists of a guiding block 69 having a nose 70 with two slanting planes or surfaces 71 and 72 (see FIG. 8), which will act jointly with the slanting sides 82 and 83 of the groove 29 of the guiding block 28 in order to ensure an accurate guiding of the tool-supporting frame 20. The guiding block 69 is mounted on the plate 102 above the side member 21 having the groove 60 by two screws 73.

In order to unlock the tool-supporting frame 20, the flexible rod 62 will have to be moved in the slot of the bayonet square 68 until the centering and locking pin 61 will occupy the chain-line position illustrated at 61a so that the centering and locking pin 61 is disengaged from its bore 34 and allows the lateral extraction of the tool-supporting frame 20.

Figure 6:
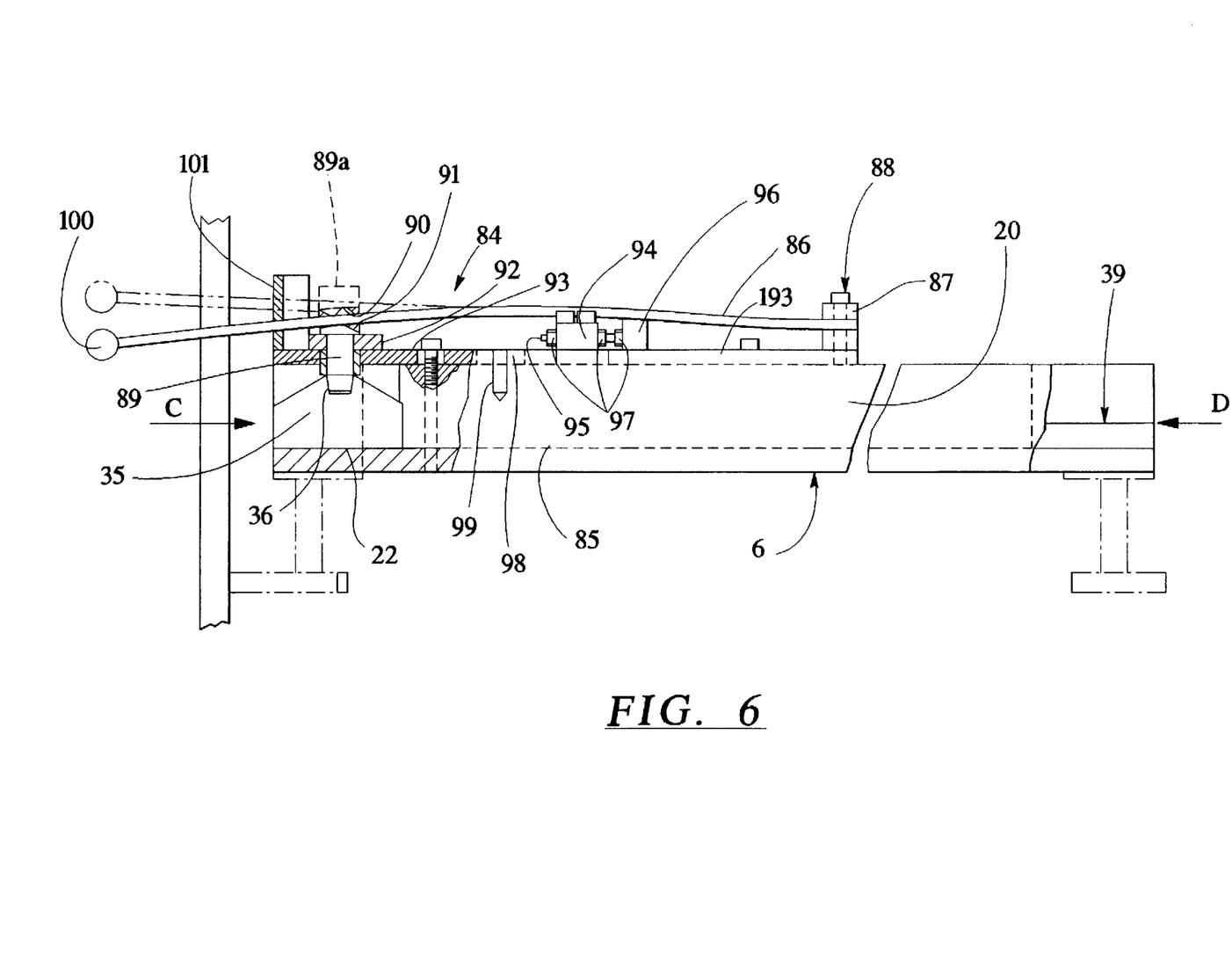
FIG. 6 is a side view with portions cut away for purposes of illustration of a second element for locking an upper tool-supporting frame.

A second locking and centering element 84 of the upper tool-supporting frame 20 is illustrated in FIG. 6. This represents the rear part of the tool-supporting frame 20 and, specifically, the second bar or side or member 22 which has an elongated groove 85 receiving a guiding element 85a of the upper cradle 6. The second locking and centering element 84 has a flexible rod 86, which is mounted at one of its ends on a slitted block 87 by means of two screws 88. The slitted block 87 is mounted on a member or plate 193 associated with the upper cradle 6. This flexible rod 86 passes through the upper part of the centering and locking element or pin 89, which has countersinks to form two opposite slanting planes 90 and 91, which planes form the shape of a roof so the slot has the shape of opposing triangles in cross section. The centering and locking pin 89 is mounted in a bushing 92, which is mounted on a packing strip or plate 93 provided at one of its ends with a setting or adjusting block 94 which receives a threaded rod 95 crossing an anchor block 96, which is mounted on a plate 193 of the upper cradle 6. A nut 97 threaded onto the threaded rod 95 will, hence, allow for adjusting the desired position of the centering and locking pin or element 89 by having the packing strip 93 move. The movement of the strip 93 is guided by an oblong slit 98 receiving a cylindrical pin 99 which is anchored to the cradle 6. The other end of the flexible rod 86 is equipped with a handle 100. In order to maintain the rod in the locking position and in the unlocking position, the flexible rod is engaged in another bayonet square 101, which has a C-shaped slot 101a illustrated in FIG. 9. The slot 101a has an upper leg and a lower leg. The bayonet square or plate 101 is mounted on the packing strip 93. In the position shown in FIG. 6, the upper tool-supporting frame 20 is in the centered and locked position, i.e., the conical parts of the centering and locking pin 89 are engaged in the slot or groove 36, hindering any lateral extraction of the tool-supporting frame 20.

Figure 10:
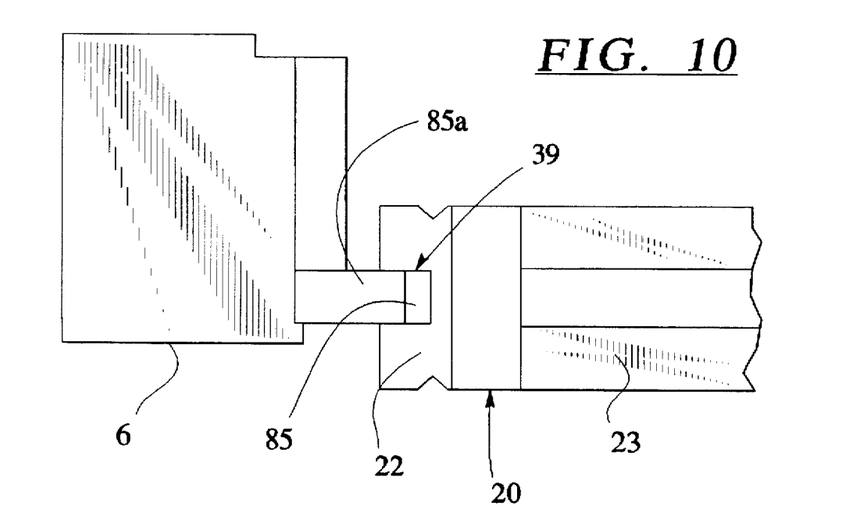
FIG. 10 is an end view taken in the direction of arrow D of FIG. 6.

On an end of the side member 22 opposite to the block 35, the frame 20 has the guiding element 39. The element 39 has the groove 85 which receives a guiding element 85a of the cradle 6, as illustrated in FIG. 10.

In order to unlock the tool-supporting frame, the flexible rod 86 will have to be moved in the slot 101a of the plate 101 until the centering and locking pin 89 will occupy the chain-dotted position 89a, which occurs when the rod is in the upper leg of the slot 101a, so that the centering and locking pin is disengaged from the groove 36 and allow the lateral extraction of the tool-supporting frame 20.

In order for the lateral extraction of the tool-supporting frame 20 from the machine, it is sufficient to move simultaneously or even one after the other the two flexible rods 62 and 86 into the position to lift the pin 61 to position 61a and the pin 89 to position 89a and to then pull the frame toward the operator. This simple and quick way requires minimum time during the exchange of the stripping tools.

Thus, as mentioned in the above description, the lower tool-supporting stripping frame will be achieved in the same manner and will also use a centering and locking device on three points, the construction being similar as to the structure of the upper tool-supporting frame.

In FIG. 7, the structure of the plate 68 with the slot forming the bayonet arrangement is illustrated. This plate 68 is part of the plate 75 which is movable on the plate 102 which, in turn, is attached to the cradle 6. As illustrated, the frame member 21 has an elongated slot 60 that receives a sliding element 60a to form a slide track for the frame 20 into and out of the cradle 6.

Figure 8:
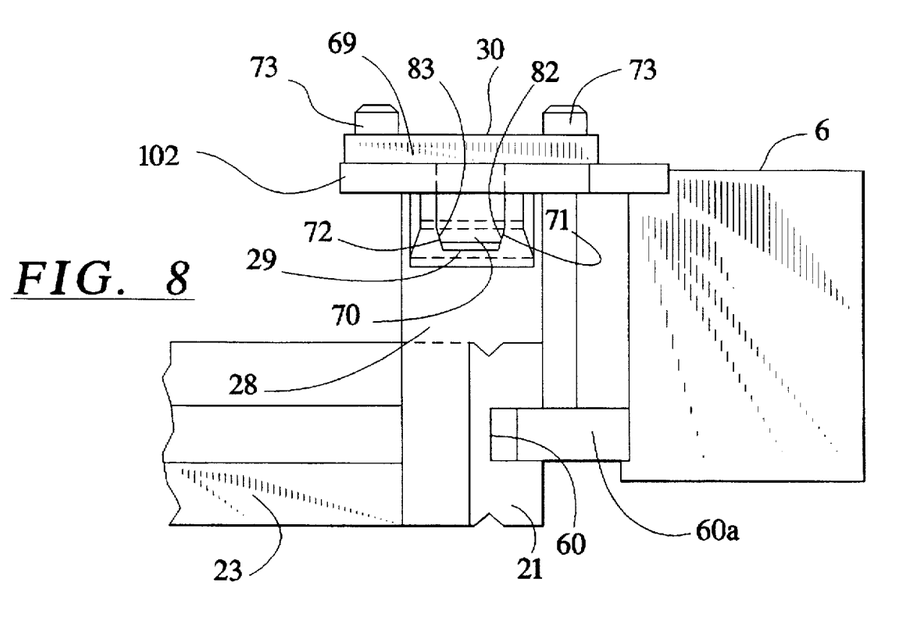
FIG. 8 is an end view taken in the direction of arrow B of FIG. 5.

The guiding element 30, as best illustrated in FIG. 8, has slanting sides 71 and 72 which are received and matched to the slanting sides 82 and 83 of the groove 29. As illustrated, the nose 70 is mounted on the plate or member 102, which is attached to the cradle 6. The member 21 has a slot 60 which receives a sliding member 60a.

Figure 9:
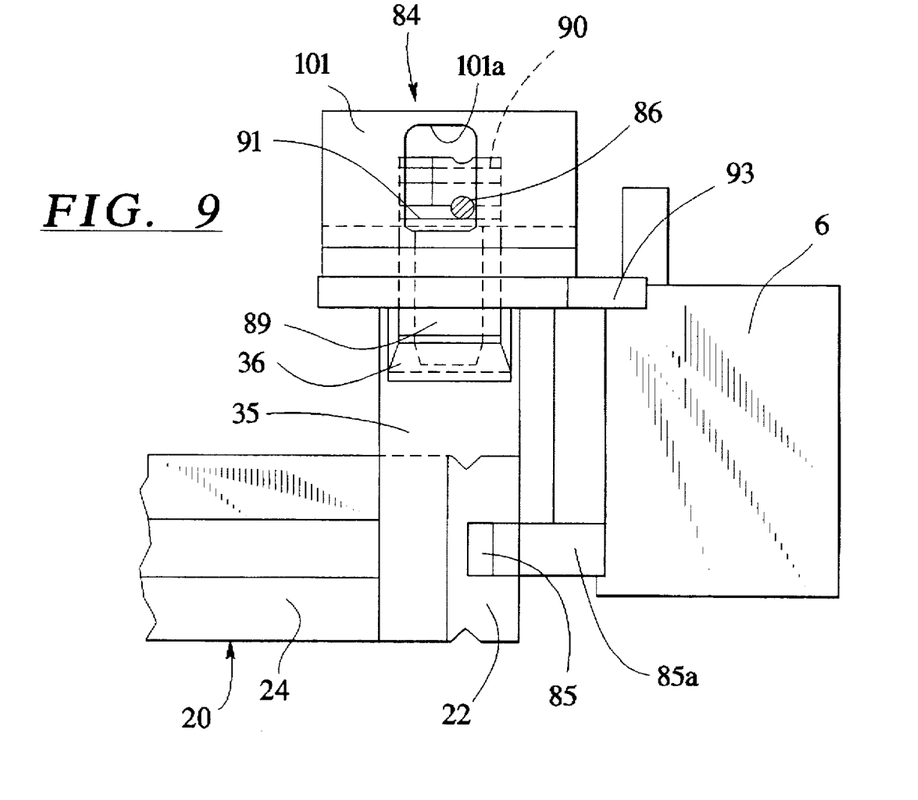
FIG. 9 is an end view taken in the direction of arrow C of FIG. 6.

As illustrated in FIGS. 9 and 10, the member 22 has the elongated groove 85 which coacts with a guiding element 85a attached to the cradle 6. The locking and centering element 84, as mentioned before, is mounted on a plate 93 which is secured to the cradle 6. Thus, when the arm 86 is raised to the upper portion of the C-shaped slot 101a of the bayonet plate 101, the pin 89 is withdrawn from the grooves 36 to allow the frame 20 to be shifted along the slide, such as 85a.

Figures 11, 12:
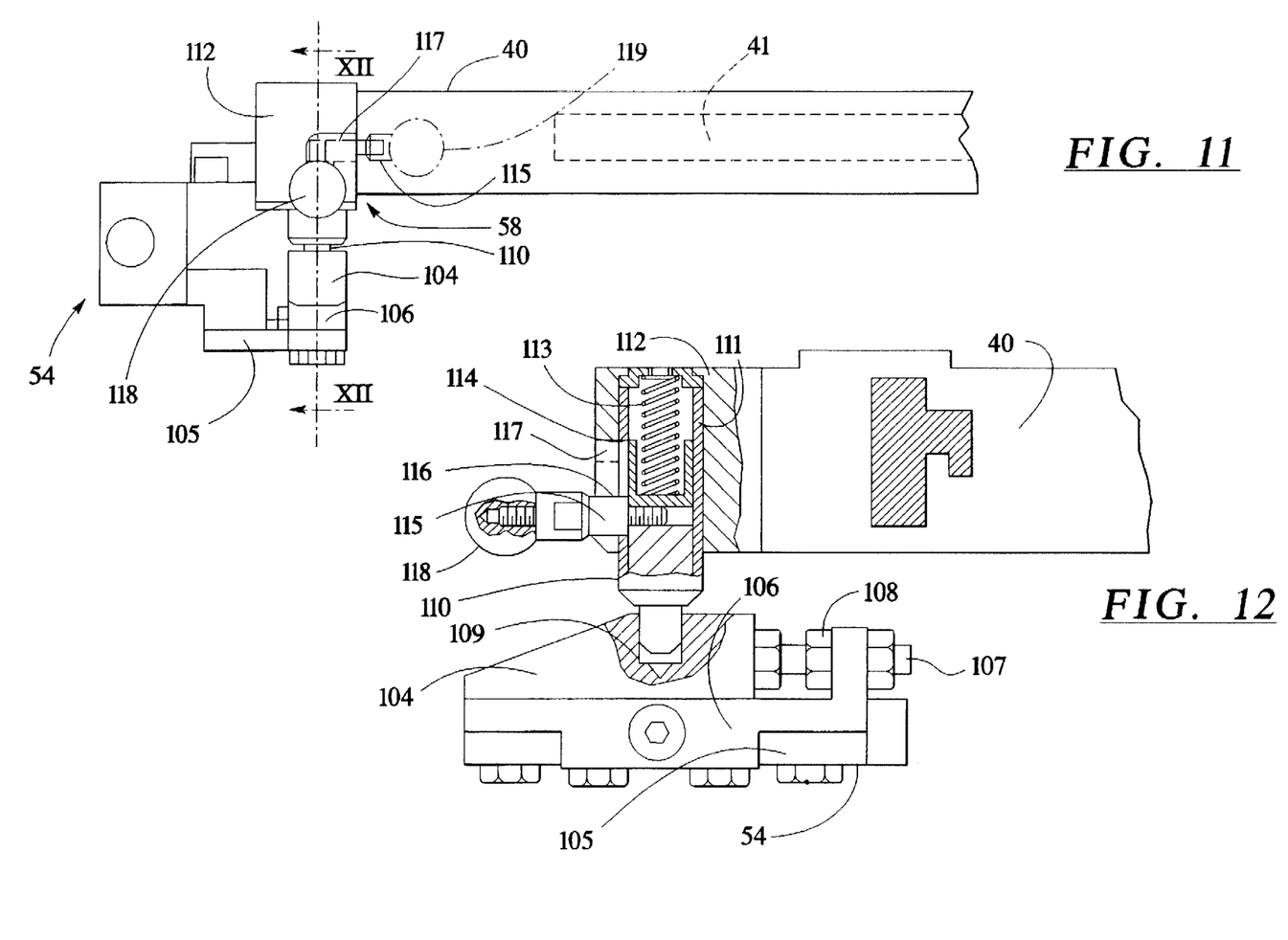
FIG. 11 is a side view of a locking element of a perforated board supporting frame.
FIG. 12 is a cross sectional view with portions in elevation taken along the line XII—XII of FIG. 11.

FIGS. 11 and 12 show the locking device 58 for a stripping board support frame 40 in which the perforated plate 41 is mounted. As represented in these Figures, the stripping board support frame has only one centering and locking device 58. The stripping board support frame 40 belongs to a movable cradle 54. A locking block 104 is mounted on a counterpart 106, which is mounted on a plate 105 of the movable cradle 54. With a view of adjusting the locking and positioning of the stripping board support frame 40, the locking block 104 has a threaded rod 107 engaging in a bore (not shown) of a counterpart 106. The position of the locking block 104 can be adjusted by acting on the nuts 108 threaded on the rod 107 (see FIG. 12). The locking block 104 has a bore 109 in which the cylindrical part of a bolt 110 engages. The bolt 110 is mounted so as to slide in a bushing 111, which is force-fitted into a support 112 belonging to the stripping board support frame 40. The bore, which receives the bushing 111, is closed at one of its ends, and this closed end entraps a spring 113, which is partially received in a bore 114 machined in the upper end of the bolt 110. The bolt 110 is provided with a control rod 115, whose cylindrical part 116 is engaged in a bayonet slot 117 made in the support 112. The control rod 115 is provided with a handle 118, with which it is possible to switch from the locked position shown in FIG. 12 to an unlocked position 119 illustrated in dot-dash lines in FIG. 11. The movement from the locked position to the unlocked position is against the action of the spring 113.

Although various minor modifications may be suggested by those versed in the art, it should be understood that I wish to embody within the scope of the patent granted hereon all such modifications as reasonably and properly come within the scope of my contribution to the art.

I claim:

1. In a device for centering and locking tool-supporting frames in a die-cutting press having movable cradles, each of said cradles having means coacting with the respective tool-supporting frame to enable sliding the frame into the cradle like a drawer, the improvements comprising each tool-supporting frame having two centering points and one centering and locking point, and each cradle having a first centering and locking device for one of the points, said centering and locking device including a rod provided with a handle being mounted on the cradle and being movable manually in a C" shape slot of a plate on the cradle from a locking position to an unlocking position to engage and disengage the frame in the cradle.

2. In a device for centering and locking tool-supporting frames according to claim 1, wherein each cradle includes a second centering and locking device, which includes a rod provided with a handle being mounted on the cradle and being movable manually in a slot with a C" shape in a plate, one of the two centering points as well as the centering and locking point coacting with the first and second centering and locking devices, the rod of each device is a flexible rod anchored at one end in an anchor block belonging to the movable cradle and being moved manually in the slot of the plate from the locking position to an unlocking position, the flexible rod extending through an upper part of a centering and locking pin which engages in a groove for the one centering point and in a bore of a groove for the centering and locking point, so that said first and second centering and locking devices can be actuated either simultaneously or individually when centering and locking the frame in the cradle.

3. In a device for centering and locking tool-supporting frames according to claim 2, wherein one of the grooves of the two centering points and of the centering and locking point are aligned to extend in one direction and are positioned on a first side of the tool-supporting frame and by the fact that the groove of the other of the two centering points is arranged to extend perpendicular with regard to the one direction and is arranged at a second side of the tool-supporting frame opposite the first side.

4. In a device according to claim 3, wherein the groove for the centering and locking point and the groove for the other centering point are on one end of the frame extending between first and second sides of the frame.

* * * * *